US012081266B2

(12) United States Patent
Lantz et al.

(10) Patent No.: US 12,081,266 B2
(45) Date of Patent: *Sep. 3, 2024

(54) REACQUIRING COMMUNICATION LINK BASED ON HISTORICAL DATA

(71) Applicant: X DEVELOPMENT LLC, Mountain View, CA (US)

(72) Inventors: Travis Lantz, Dublin, CA (US); Paul Csonka, Sunnyvale, CA (US); Baris Ibrahim Erkmen, Sunnyvale, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/205,167

(22) Filed: Jun. 2, 2023

(65) Prior Publication Data

US 2023/0318706 A1    Oct. 5, 2023

Related U.S. Application Data

(63) Continuation of application No. 17/867,858, filed on Jul. 19, 2022, now Pat. No. 11,705,967, which is a
(Continued)

(51) Int. Cl.
*H04B 10/00*     (2013.01)
*H04B 10/077*    (2013.01)
(Continued)

(52) U.S. Cl.
CPC ..... *H04B 10/1149* (2013.01); *H04B 10/0779* (2013.01); *H04B 10/079* (2013.01); *H04B 10/1143* (2013.01); *H04W 16/28* (2013.01)

(58) Field of Classification Search
CPC ... H04B 10/11; H04B 10/112; H04B 10/1123; H04B 10/1125; H04B 10/1127;
(Continued)

(56) References Cited

U.S. PATENT DOCUMENTS 8,634,974 B2    1/2014  Devaul et al.
8,942,562 B2 *  1/2015  Pusarla ................ H04B 10/112
                                                        398/115
(Continued)

OTHER PUBLICATIONS

Bai, Shuai , et al., "Predictive filtering-based fast reacquisition approach for space-borne acquisition, tracking, and pointing systems", Key Lab of Space Active Opto-Electronic Technology and Systems, Shanghai Inst. of Technical Physics, Chinese Academy of Sciences, Shanghai, China, published Oct. 20, 2014, vol. 22, No. 22, pp. 1-14.
(Continued)

*Primary Examiner* — Hanh Phan
(74) *Attorney, Agent, or Firm* — Botos Churchill IP Law LLP

(57) ABSTRACT

The disclosure provides for a method for reacquiring a communication link between a first communication device and a second communication device. The method includes using one or more processors of the first communication device to receive historical data related to the first communication device and an environment surrounding the first communication device. The one or more processors are then used to determine one or more trends in the historical data related to fading of the communication link. Based on the one or more trends, the one or more processors are used to determine a starting time and an initial search direction for
(Continued)

a search for the communication link. The one or more processors then execute the search at the starting time from the initial search direction.

20 Claims, 3 Drawing Sheets

Related U.S. Application Data continuation of application No. 17/070,585, filed on Oct. 14, 2020, now Pat. No. 11,431,411, which is a continuation of application No. 16/865,489, filed on May 4, 2020, now Pat. No. 10,841,008, which is a continuation of application No. 16/256,393, filed on Jan. 24, 2019, now Pat. No. 10,680,710.

(51) Int. Cl.
    *H04B 10/079*    (2013.01)
    *H04B 10/114*    (2013.01)
    *H04W 16/28*     (2009.01)

(58) Field of Classification Search
    CPC .............. H04B 10/1129; H04B 10/114; H04B 10/1143; H04B 10/1149; H04B 10/40; H04B 10/2507; H04B 10/118; H04B 10/0795; H04B 10/079; H04B 10/0779
    USPC ....... 398/118, 119, 127, 128, 129, 130, 131, 398/135, 136, 158, 159, 33, 38, 121, 122, 398/124, 125, 115, 25, 26, 27
    See application file for complete search history.

(56) References Cited

U.S. PATENT DOCUMENTS

| | | | |
|---|---|---|---|
| 10,680,710 B1 | 6/2020 | Lantz et al. | |
| 10,841,008 B2 | 11/2020 | Lantz et al. | |
| 11,431,411 B2* | 8/2022 | Lantz .................. | H04B 10/0779 |
| 2003/0067657 A1* | 4/2003 | Dimmler ............ | H04B 7/18506 |
| | | | 398/129 |
| 2007/0031151 A1 | 2/2007 | Cunningham et al. | |
| 2007/0297808 A1 | 12/2007 | Pavelchek | |
| 2013/0177322 A1 | 7/2013 | Devaul et al. | |
| 2015/0326313 A1 | 11/2015 | Brouillet | |

OTHER PUBLICATIONS

Bertin, Clement, et al., "Prediction of optical communication link availability: real-time observation of cloud patterns using a ground-based thermal infrared camera", Optics in Atmospheric Propagation and Adaptive Systems XVIII, vol. 9641; downloaded from https://www.spiedigitallibrary.org/conference-proceedings-of-spie on Dec. 6, 2018, pp. 1-8.

Saw, Wee-Leong, et al., "Free Space Optical Alignment System Using GPS", School of Electrical and Computer Engineering, University of Oklahoma-Tulsa; Proc. SPIE 5712, Free-Space Laser Communication Technologies XVII, (Apr. 18, 2005), pp. 101-109.

* cited by examiner

REACQUIRING COMMUNICATION LINK BASED ON HISTORICAL DATA

CROSS REFERENCE TO RELATED APPLICATIONS

This application is a continuation of U.S. patent application Ser. No. 17/867,858, filed Jul. 19, 2022 which is a continuation of U.S. patent application Ser. No. 17/070,585, filed Oct. 14, 2020, issued as U.S. Pat. No. 11,431,411, which is a continuation of U.S. patent application Ser. No. 16/865,489, filed May 4, 2020, issued as U.S. Pat. No. 10,841,008, which is a continuation of U.S. patent application Ser. No. 16/256,393, filed Jan. 24, 2019, issued as U.S. Pat. No. 10,680,710, the disclosures of which are hereby incorporated herein by reference.

BACKGROUND

Communication terminals may transmit and receive optical signals through free space optical communication (FSOC) links. In order to accomplish this, such terminals generally use acquisition and tracking systems to establish the optical link by pointing optical beams towards one another. For instance, a transmitting terminal may use a beacon laser to illuminate a receiving terminal, while the receiving terminal may use a position sensor to locate the transmitting terminal and to monitor the beacon laser. Steering mechanisms may maneuver the terminals to point toward each other and to track the pointing once acquisition is established. A high degree of pointing accuracy may be required to ensure that the optical signal will be correctly received.

The mechanisms of communication terminals may vary physically due to differences in operation over time. For example, mechanisms may be cycled through large temperature ranges and experience significantly varying plant (mechanism) characteristics. Mechanisms may wear with use, which may change friction and viscosity characteristics. Mechanisms may also have components that reduce performance using traditional controls techniques. In these situations, it may be difficult to compensate for the variability caused by the changes in the components in order to obtain reliable operation of a communication terminal.

BRIEF SUMMARY

Aspects of the disclosure provide for a method for reacquiring a communication link between a first communication device and a second communication device. The method includes receiving, by one or more processors of the first communication device, historical data related to the first communication device and an environment surrounding the first communication device; determining, by the one or more processors, one or more trends in the historical data related to fading of the communication link; determining, by the one or more processors based on the one or more trends, a starting time and an initial search direction for a search for the communication link; and executing, by the one or more processors, the search at the starting time from the initial search direction.

In one example, determining the one or more trends includes determining a given trend by identifying a given time period during a given cycle where fades occur more often than in other time periods, and determining a characteristic of environmental data or physical data from the historical data that corresponds with the given time period. In another example, determining the one or more trends includes determining a given trend by identifying characteristics of environmental data or physical data from the historical data that occurs prior to a fade. In a further example, determining the one or more trends includes determining a given trend by identifying a characteristic of a fade using physical data from the historical data, and matching the characteristic of the fade with a characteristic of environmental data from the historical data.

In yet another example, determining the one or more trends includes determining a given trend by identifying an amount of drift of the communication device from the linked pointing direction using physical data from the historical data. In a still further example, determining the starting time and the initial search direction includes determining a point in time when environmental data from the historical data does not includes factors that prevent transmission of a signal from the first communication device, or determining a predicted location of the second communication device based on the one or more trends. In another example, the method also includes adjusting, by the one or more processors, a pointing direction of the first communication device while executing the search according to current data related to the first communication device and the environment surrounding the first communication device.

Other aspects of the disclosure provide for a communication system. The communication system includes one or more sensors configured to detect data related to the communication system and an environment surrounding the communication system; a steering mechanism; and one or more processors operatively coupled to the one or more sensors and the steering mechanism. The one or more processors are configured to receive historical data related to the communication system and the environment surrounding the communication system; determine one or more trends in the historical data related to fading of a communication link with a remote communication system; determine, based on the one or more trends, a starting time and an initial search direction for a search for the communication link; and control the steering mechanism to execute the search at the starting time from the initial search direction.

In one example, the one or more processors are configured to determine the one or more trends according to an identification of a given time period during a given cycle where fades occur more often than in other time periods, and a determination of a characteristic of environmental data or physical data from the historical data that corresponds with the given time period. In another example, determining the one or more trends according to a determination of a given trend by identifying characteristics of environmental data or physical data from the historical data that occurs prior to a fade. In a further example, the one or more processors are configured to determine the one or more trends according to an identification of a characteristic of a fade using physical data from the historical data, and a match of the characteristic of the fade with a characteristic of environmental data from the historical data.

In yet another example, the one or more processors are configured to determine the one or more trends according to identification of an amount of drift of the communication system from the linked pointing direction using physical data from the historical data. In a still further example, the one or more processors are configured to determine the starting time and the initial search direction according to a determination of a point in time when environmental data from the historical data does not includes factors that prevent transmission of a signal from the first communication device, or a determination of a predicted location of the second communication device based on the one or more trends. In another example, the one or more processors are further configured to control the steering mechanism to adjust a pointing direction of the communication system while executing the search according to current data related to the communication system and the environment surrounding the communication system.

Further aspects of the disclosure provide for a non-transitory, tangible computer-readable storage medium on which computer readable instructions of a program are stored. The instructions, when executed by one or more processors of a first communication device, cause the one or more processors to perform a method. The method includes receiving historical data related to the first communication device and an environment surrounding the first communication device; determining one or more trends in the historical data related to fading of a communication link with a second communication device; determining, based on the one or more trends, a starting time and an initial search direction for a search for the communication link; and executing the search at the starting time from the initial search direction.

In one example, determining the one or more trends includes determining a given trend by identifying a given time period during a given cycle where fades occur more often than in other time periods, and determining a characteristic of environmental data or physical data from the historical data that corresponds with the given time period. In another example, determining the one or more trends includes determining a given trend by identifying characteristics of environmental data or physical data from the historical data that occurs prior to a fade. In a further example, determining the one or more trends includes determining a given trend by identifying a characteristic of a fade using physical data from the historical data, and matching the characteristic of the fade with a characteristic of environmental data from the historical data.

In yet another example, determining the one or more trends includes determining a given trend by identifying an amount of drift of the communication device from the linked pointing direction using physical data from the historical data. In a still further example, the method also includes adjusting a pointing direction of the first communication device while executing the search according to current data related to the first communication device and the environment surrounding the first communication device.

DETAILED DESCRIPTION

Overview

The technology relates to a method of acquiring a communication link using historical data related to a communication device and an environment surrounding the communication device. The communication device may be configured to initially acquire the communication link, or reacquire the communication link after the communication link goes down, by performing a search through a series of varying pointing directions.

These features, described in more detail below, can provide a communication device that may respond to fades and other conditions quickly. The system may start the search at a particular time from a more useful starting location and therefore be able to reduce the time to realign and reestablish the link. The system may also have a higher average throughput due to reduced search-related downtime leading to increased availability. In addition, the system may also use less power and have a longer lifetime as a result of more efficient searching.

Example Systems

Figure 1:
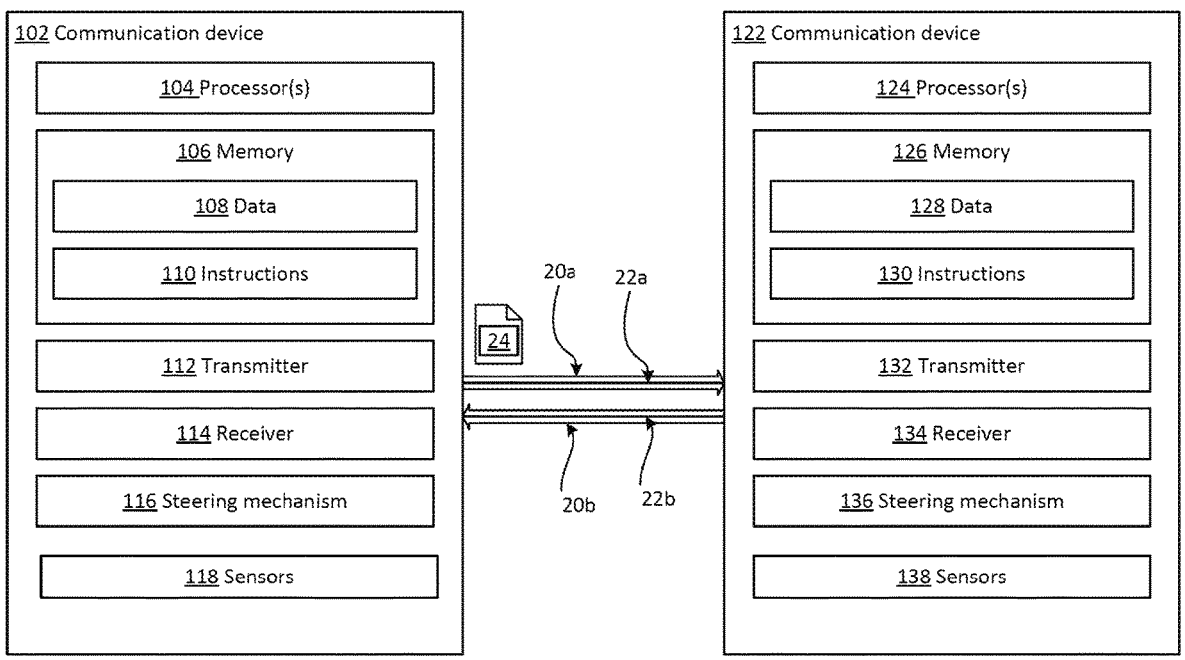
FIG. 1 is a block diagram 100 of a first communication device and a second communication device in accordance with aspects of the disclosure.

FIG. 1 is a block diagram 100 of a first communication device 102 of a first communication terminal configured to form one or more links with a second communication device 122 of a second communication terminal, for instance as part of a system such as a free-space optical communication (FSOC) system. For example, the first communication device 102 includes one or more processors 104, a memory 106, a transmitter 112, a receiver 114, a steering mechanism 116, and one or more sensors 118.

The one or more processors 104 may be any conventional processors, such as commercially available CPUs. Alternatively, the one or more processors may be a dedicated device such as an application specific integrated circuit (ASIC) or other hardware-based processor, such as a field programmable gate array (FPGA). Although FIG. 1 functionally illustrates the one or more processors 104 and memory 106 as being within the same block, the one or more processors 104 and memory 106 may actually comprise multiple processors and memories that may or may not be stored within the same physical housing. Accordingly, references to a processor or computer will be understood to include references to a collection of processors or computers or memories that may or may not operate in parallel.

Memory 106 may store information accessible by the one or more processors 104, including data 108, and instructions 110, that may be executed by the one or more processors 104. The memory may be of any type capable of storing information accessible by the processor, including a computer-readable medium such as a hard-drive, memory card, ROM, RAM, DVD or other optical disks, as well as other write-capable and read-only memories. The system and method may include different combinations of the foregoing, whereby different portions of the data 108 and instructions 110 are stored on different types of media. In the memory of each communication device, such as memory 106, calibration information may be stored, such as one or more offsets determined for tracking a signal.

Data 108 may be retrieved, stored or modified by the one or more processors 104 in accordance with the instructions 110. For instance, although the technology is not limited by any particular data structure, the data 108 may be stored in computer registers, in a relational database as a table having a plurality of different fields and records, XML documents or flat files.

The instructions 110 may be any set of instructions to be executed directly (such as machine code) or indirectly (such as scripts) by the one or more processors 104. For example, the instructions 110 may be stored as computer code on the computer-readable medium. In that regard, the terms "instructions" and "programs" may be used interchangeably herein. The instructions 110 may be stored in object code format for direct processing by the one or more processors 104, or in any other computer language including scripts or collections of independent source code modules that are interpreted on demand or compiled in advance. Functions, methods and routines of the instructions 110 are explained in more detail below.

The one or more processors 104 are in communication with the transmitter 112 and the receiver 114. Transmitter 112 and receiver 114 may be part of a transceiver arrangement in the first communication device 102. The one or more processors 104 may therefore be configured to transmit, via the transmitter 112, data in a signal, and also may be configured to receive, via the receiver 114, communications and data in a signal. The received signal may be processed by the one or more processors 104 to extract the communications and data.

The transmitter 112 may be configured to output a beacon beam 20 that allows one communication device to locate another, as well as a communication signal over a communication link 22. The communication signal may be a signal configured to travel through free space, such as, for example, a radio-frequency signal or optical signal. In some cases, the transmitter includes a separate beacon transmitter configured to transmit the beacon beam and one or more communication link transmitters configured to transmit the optical communication beam. Alternatively, the transmitter 112 may include one transmitter configured to output both the beacon beam and the communication signal. The beacon beam 20 may illuminate a larger solid angle in space than the optical communication beam used in the communication link 22, allowing a communication device that receives the beacon beam to better locate the beacon beam. For example, the beacon beam carrying a beacon signal may cover an angular area on the order of a square milliradian, and the optical communication beam carrying a communication signal may cover an angular area on the order of a hundredth of a square milliradian.

As shown in FIG. 1, the transmitter 112 of the first communication device 102 is configured to output a beacon beam 20*a* to establish a communication link 22*a* with the second communication device 122, which receives the beacon beam 20*a*. The first communication device 102 may align the beacon beam 20*a* co-linearly with the optical communication beam (not shown) that has a narrower solid angle than the beacon beam 20*a* and carries a communication signal 24. As such, when the second communication device 122 receives the beacon beam 20*a*, the second communication device 122 may establish a line-of-sight link with the first communication device 102 or otherwise align with the first communication device. As a result, the communication link 22*a* that allows for the transmission of the optical communication beam (not shown) from the first communication device 102 to the second communication device 122 may be established.

The receiver 114 may include an optical fiber and a tracking system configured to detect the optical beam. The tracking system may include at least a tracking sensor. In addition, the tracking system may also include a lens, mirror, or other system configured to divert a portion of a received optical beam to the tracking sensor and allow the remaining portion of the received optical beam to couple with the optical fiber. The tracking sensor may include, but is not limited to, a position sensitive detector (PSD), a charge-coupled device (CCD) camera, a focal plane array, a photodetector, a quad-cell detector array, or a CMOS sensor. The tracking sensor is configured to detect a signal location at the tracking sensor and convert the received optical beam into an electric signal using the photoelectric effect. The tracking system is able to track the received optical beam, which may be used to direct the steering mechanism 116 to counteract disturbances due to scintillation and/or platform motion.

Furthermore, the one or more processors 104 are in communication with the steering mechanism 116 for adjusting the pointing direction of the transmitter 112, receiver 114, and/or optical beam. The steering mechanism 116 may include one or more mirrors that steer an optical signal through the fixed lenses and/or a gimbal configured to move the transmitter 112 and/or the receiver 114 with respect to the communication device. In particular, the steering mechanism 116 may be a MEMS 2-axis mirror, 2-axis voice coil mirror, or piezo electronic 2-axis mirror. The steering mechanism 116 may be configured to steer the transmitter, receiver, and/or optical beam in at least two degrees of freedom, such as, for example, yaw and pitch. The adjustments to the pointing direction may be made to acquire a communication link, such as communication link 22, between the first communication device 102 and the second communication device 122. To perform a search for a communication link, the one or more processors 104 may be configured use the steering mechanism 116 to point the transmitter 112 and/or the receiver 114 in a series of varying directions until a communication link is acquired. In addition, the adjustments may optimize transmission of light from the transmitter 112 and/or reception of light at the receiver 114.

The one or more processors 104 are also in communication with the one or more sensors (or estimators) 118. The one or more sensors 118 may be configured to monitor a state of the first communication device 102. The one or more sensors may include an inertial measurement unit (IMU), encoders, accelerometers, and/or gyroscopes configured to measure one or more of pose, angle, velocity, torques, as well as other forces. In addition, the one or more sensors 118 may include components configured to measure one or more environmental conditions such as, for example, temperature, wind, radiation, precipitation, humidity, etc. In this regard, the one or more sensors 118 may include thermometers, barometers and/or hygrometers, etc. While the one or more sensors 118 are depicted in FIG. 1 as being in the same block as the other components of the first communication device 102, in some implementations, some or all of the one or more sensors may be separate and/or physically remote from the first communication device 102.

The second communication device 122 includes one or more processors 124, a memory 126, a transmitter 132, a receiver 134, a steering mechanism 136, and one or more sensors 138. The one or more processors 124 may be similar to the one or more processors 104 described above. Memory 126 may store information accessible by the one or more processors 124, including data 128 and instructions 130 that may be executed by processor 124. Memory 126, data 128, and instructions 130 may be configured similarly to memory 106, data 108, and instructions 110 described above. In addition, the transmitter 132, the receiver 134, and the steering mechanism 136 of the second communication device 122 may be similar to the transmitter 112, the receiver 114, and the steering mechanism 116 described above.

Like the transmitter 112, transmitter 132 may be configured to output both an optical communication beam and a beacon beam. For example, transmitter 132 of the second communication device 122 may output a beacon beam 20*b* to establish a communication link 22*b* with the first communication device 102, which receives the beacon beam 20b. The second communication device 122 may align the beacon beam 20b co-linearly with the optical communication beam (not shown) that has a narrower solid angle than the beacon beam and carries another communication signal. As such, when the first communication device 102 receives the beacon beam 20a, the first communication device 102 may establish a line-of-sight with the second communication device 122 or otherwise align with the second communication device. As a result, the communication link 22b, that allows for the transmission of the optical communication beam (not shown) from the second communication device 122 to the first communication device 102, may be established.

Like the receiver 114, the receiver 134 includes an optical fiber and a tracking system configured to detect the optical beam with the same or similar features as described above with respect to the receiver 114. In addition, the tracking system may also include a lens, mirror, or other system configured to divert a portion of a received optical beam to the tracking sensor and allow the remaining portion of the received optical beam to couple with the optical fiber. The tracking system of receiver 134 is configured to track the received optical beam, which may be used to direct the steering mechanism 136 to counteract disturbances due to scintillation and/or platform motion.

The one or more processors 124 are in communication with the steering mechanism 136 for adjusting the pointing direction of the transmitter 132, receiver 134, and/or optical beam, as described above with respect to the steering mechanism 116. The adjustments to the pointing direction may be made to establish acquisition and connection link, such as communication link 22, between the first communication device 102 and the second communication device 122. In addition, the one or more processors 124 are in communication with the one or more sensors 138 as described above with respect to the one or more sensors 118. The one or more sensors 138 may be configured to monitor a state of the second communication device 122 in a same or similar manner that the one or more sensors 118 are configured to monitor the state of the first communication device 102.

As shown in FIG. 1, the communication links 22a and 22b may be formed between the first communication device 102 and the second communication device 122 when the transmitters and receivers of the first and second communication devices are aligned, or in a linked pointing direction. Using the communication link 22a, the one or more processors 104 can send communication signals to the second communication device 122. Using the communication link 22b, the one or more processors 124 can send communication signals to the first communication device 102. In some examples, it is sufficient to establish one communication link 22 between the first and second communication devices 102, 122, which allows for the bi-directional transmission of data between the two devices. The communication links 22 in these examples are FSOC links. In other implementations, one or more of the communication links 22 may be radio-frequency communication links or another type of communication link capable of travelling through free space.

Figure 2:
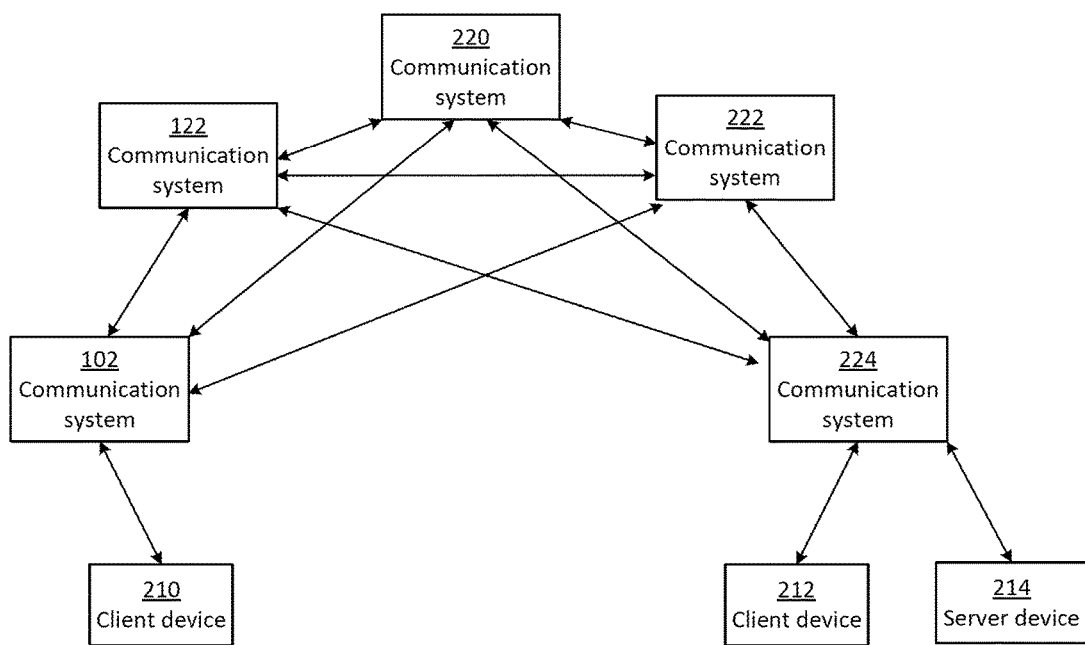
FIG. 2 is a pictorial diagram of a network 200 in accordance with aspects of the disclosure.

As shown in FIG. 2, a plurality of communication devices, such as the first communication device 102 and the second communication device 122, may be configured to form a plurality of communication links (illustrated as arrows) between a plurality of communication terminals, thereby forming a network 200. The network 200 may include client devices 210 and 212, server device 214, and communication devices 102, 122, 220, 222, and 224. Each of the client devices 210, 212, server device 214, and communication devices 220, 222, and 224 may include one or more processors, a memory, a transmitter, a receiver, and a steering mechanism similar to those described above. Using the transmitter and the receiver, each communication device in network 200 may form at least one communication link with another communication device, as shown by the arrows. The communication links may be for optical frequencies, radio frequencies, other frequencies, or a combination of different frequency bands. In FIG. 2, the communication device 102 is shown having communication links with client device 210 and communication devices 122, 220, and 222. The communication device 122 is shown having communication links with communication devices 102, 220, 222, and 224.

The network 200 as shown in FIG. 2 is illustrative only, and in some implementations the network 200 may include additional or different communication terminals. The network 200 may be a terrestrial network where the plurality of communication devices is on a plurality of ground communication terminals. In other implementations, the network 200 may include one or more high-altitude platforms (HAPs), which may be balloons, blimps or other dirigibles, airplanes, unmanned aerial vehicles (UAVs), satellites, or any other form of high altitude platform, or other types of moveable or stationary communication terminals. In some implementations, the network 200 may serve as an access network for client devices such as cellular phones, laptop computers, desktop computers, wearable devices, or tablet computers. The network 200 also may be connected to a larger network, such as the Internet, and may be configured to provide a client device with access to resources stored on or provided through the larger computer network.

Example Methods

Figure 3:
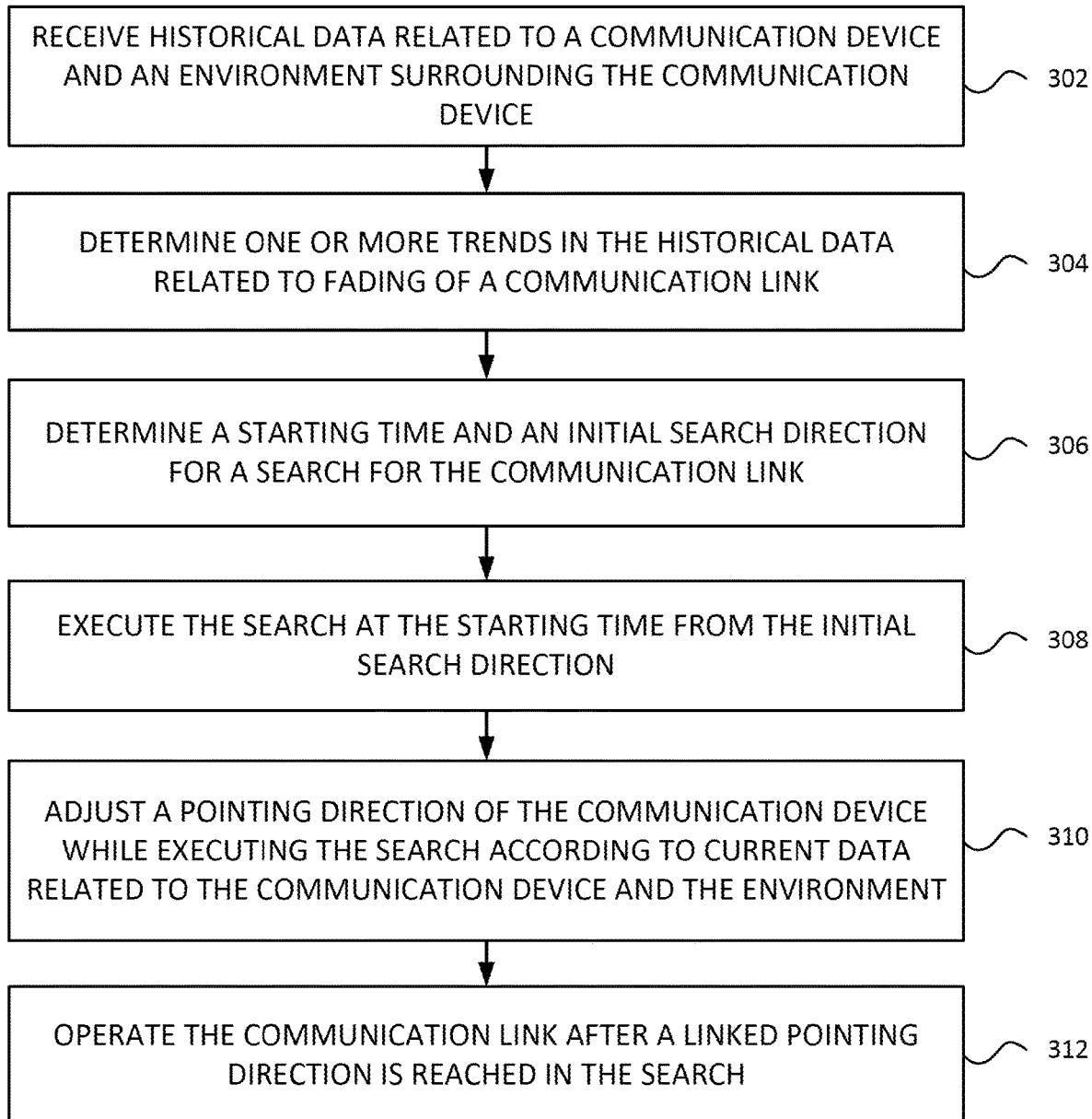
FIG. 3 is a flow diagram 300 depicting a method in accordance with aspects of the disclosure.

When the communication link 22 between the first communication device 102 and the second communication device 122 is lost or fades, the one or more processors 104 may determine settings for a search for reacquiring the communication link 22 prior to executing the search as described below and depicted in flow diagram 300 in FIG. 3. In FIG. 3, flow diagram 300 is shown in accordance with aspects of the disclosure that may be performed by the one or more processors 104 of the first communication device 102. While FIG. 3 shows blocks in a particular order, the order may be varied and multiple operations may be performed simultaneously. Also, operations may be added or omitted. The one or more processors 124 may also determine settings for a search for reacquiring the communication link 22 in a same or similar way.

At block 302, the one or more processors 104 of the first communication device 102 receive historical data related to the first communication device 102 and the environment surrounding the first communication device. The historical data may include environmental data, such as temperature, humidity, wind patterns, etc., over a time frame. By way of example, the environmental data may be obtained using the one or more sensors 118, retrieved from a local memory, or received from a remote database. The time frame may be, for example, 12 hours, a day, a month, or a year. The historical data may also include physical data related to a status of the first communication device 102, such as telemetry measurements or IMU measurements from the one or more sensors 118. The telemetry measurements may include data related to a fade of the optical signal, such as an amount of power or a frequency received over a time frame from a beacon beam or a communication beam. The IMU measurements may include an orientation of the first communication device 102 over time. The time frame for the telemetry measurements may be, for example, 30 seconds, 10 minutes, or a 24 hour period. The sampling rate for these measurements may be 50 kHz, or more or less, which may also be averaged over equal intervals in order to track the measurements at a lower frequency, such as 1 Hz.

At block 304, the one or more processors 104 determine one or more trends in the historical data related to fading of the communication link 22 between the first communication device 102 and the second communication device 122. The one or more processors 104 may determine a first trend by identifying a time period during a 24-hour cycle where fades occur more often than other time periods and determining a characteristic of environmental data or physical data that corresponds with the same time period. For example, the first trend in the historical data may be that fades occur more often at or around sunrise, or between 5 a.m. and 7 a.m., when the relative humidity is the highest or fog is most often forecasted or detected. The one or more processors 104 may also determine a second trend by identifying characteristics of environmental data or physical data that often occurs just prior to a fade, such as within 10 seconds, 1 minute, 30 minutes, or more or less before the fade. Characteristics of the environmental data or physical data may be related to a gust of wind having at least a minimum speed. The one or more processors 104 may also determine a third trend by identifying a characteristic of a fade using the physical data and matching the characteristic of the fade with a characteristic of environmental data. For example, the third trend in the historical data may be that the amount of fluctuation from maximum to minimum received power (i.e., dynamic range) and/or amount of signal power over time matches the amount of dynamic range and/or amount of signal power over time due to the presence of fog or rain. When fog is coming in, the dynamic range will stay the same or decrease as fog increases, and the amount of signal power will steadily drop over time. When rain is present, the dynamic range will increase or vary more erratically over time, and the amount of average power will vary up and down at a more rapid rate than in the presence of fog. The one or more processors 104 may determine a fourth trend by identifying an amount of drift of the first communication device 102 from the linked pointing direction using the physical data. In this example, the drift may be detected as 10 degrees downwards towards the ground using the IMU measurements and the previously known linked pointing direction.

At block 306, the one or more processors 104 are configured to determine a starting time and an initial search direction for the search using the one or more trends in the historical data. The starting time may be determined to be a point in time when environmental data does not include factors that prevent transmission or receipt of a signal from the first communication device. For example, the point in time may be after environmental factors that obstruct transmission or receipt of an optical signal has left the environment of the first communication device 102. For example, based on the first trend, the one or more processors 104 may determine the starting time to be at least after 7 a.m., when the relative humidity historically begins to lower during the day. Based on the third trend, the one or more processors 104 may determine the starting time to be after the fog around the first communication device 102 decreases to an acceptable amount.

The initial search direction may be determined based on a predicted location of the second communication device 122. For example, based on the first trend and the third trend, the initial search direction may be determined as a current pointing direction of the first communication device 102 since the fade was likely due to environmental factors unrelated to the pointing direction of the first communication device 102 or the second communication device 122. Based on the third trend, the initial search direction may be determined to be a number of degrees opposite the direction of the gust of wind to counteract a possible shift of the first communication device 102 or the second communication device 122 due to the gust of wind. Based on the fourth trend, the initial search direction may be determined to be 10 degrees upwards away from the ground to counteract the detected drift of the first communication device 102.

At block 308, the one or more processors 104 are able to execute the search at the starting time from the initial search direction. Executing the search may include controlling the steering mechanism 116 of the first communication device 102 to point the transmitter 112 and/or the receiver 114 in a search pattern comprising a plurality of directions that starts from the initial search direction. The plurality of directions may increase in distance from the initial search direction. When the search pattern is started from the initial search direction that has been determined as described above, a linked pointing direction may be closer to the initial search direction than when the initial search direction is determined in other ways. In addition, when the search is started at the starting time that has been determined as described above, the search may be started when conditions for reacquiring the communication link are better than when the starting time is determined in other ways. As such, a communication link may be reacquired earlier in the search.

In some implementations, the one or more processors 104 may further determine other settings for the search and execute them. The other settings may include an amount of power, a frequency, or a width of a signal. Characteristics of the current environment may be predicted or detected based on the environmental data received by the one or more processors 104. The one or more processors 104 may then select these other settings for the search based on whether the settings increase detectability of an optical signal in the current environment.

At block 310, the one or more processors 104 are configured to adjust a pointing direction of the first communication device 102 while executing the search according to the historical data or current data related to the first communication device 102. The adjustment may be made by estimating an amount of offset caused by changes in the environmental data or the physical data. Similar to the historical data described above, the current data may include environmental data, such as temperature, humidity, wind patterns, etc., and physical data, such as telemetry measurements or IMU measurements. For example, wind data may be collected as current data and may be used to estimate an amount of offset caused by an amount of wind. In some implementations, the one or more processors 104 may also predict an amount of offset according to a trend in the historical data and/or the current data. For example, a trend in wind data may indicate that, as an amount of wind steadily increases, a corresponding amount of offset of the first communication device occurs. The trend may be applied extrapolated into a future time to predict an amount of offset that may occur. The one or more processors 104 may then determine an adjusted pointing direction to counteract the estimated or predicted amount of offset caused by the amount of wind and control the steering mechanism 116 using the adjusted pointing direction. Alternatively, the one or more processors 104 may apply an amount of drive to counteract the amount of offset caused by the amount of wind.

At block 312, the one or more processors 104 are configured to control operation of the communication link after the linked pointing direction is reached.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method comprising:
estimating, by one or more processors of a first communication device, an amount of offset caused by changes in an environment around the first communication device;
executing, by the one or more processors, a search for a linked pointing direction to reacquire a communication link between the first communication device and a second communication device by controlling a steering mechanism of the first communication device to point at least one of a transmitter or a receiver of the first communication device in different pointing directions according to a search pattern, wherein the different pointing directions are adjusted to counteract the estimated amount of offset; and
in response to reaching the linked pointing direction, controlling, by the one or more processors, operation of the communication link.

2. The method of claim 1, wherein the amount of offset is based on a change in a wind pattern.

3. The method of claim 1, wherein the amount of offset is based on a change in temperature.

4. The method of claim 1, wherein the amount of offset is based on a change in humidity.

5. The method of claim 1, wherein the search is executed according to historical data or current data related to the first communication device.

6. The method of claim 1, further comprising:
receiving, by the one or more processors, environmental data; and
predicting, by the one or more processors, one or more characteristics of a current environment around the first communication device based on the received environmental data.

7. The method of claim 1, further comprising determining one or more settings for executing the search.

8. The method of claim 7, wherein the one or more settings include an amount of power, a frequency of a signal, or a width of the signal.

9. The method of claim 8, wherein the one or more settings are selected based on whether the one or more settings increase detectability of an optical signal.

10. The method of claim 1, wherein the amount of offset is estimated according to a trend in historical data or current data related to the first communication device.

11. A first communication device comprising:
a transmitter;
a receiver;
a steering mechanism; and
one or more processors operably coupled to the steering mechanism, the one or more processors being configured to:
estimate an amount of offset caused by changes in an environment around the first communication device;
execute a search for a linked pointing direction to reacquire a communication link between the first communication device and a second communication device by controlling the steering mechanism to point at least one of the transmitter or the receiver in different pointing directions according to a search pattern, wherein the different pointing directions are adjusted to counteract the estimated amount of offset; and
in response to reaching the linked pointing direction, control operation of the communication link.

12. The first communication device of claim 11, wherein the amount of offset is estimated based on a change in a wind pattern.

13. The first communication device of claim 11, wherein the amount of offset is estimated based on a change in temperature.

14. The first communication device of claim 11, wherein the amount of offset is estimated based on a change in humidity.

15. The first communication device of claim 11, wherein the search is executed according to historical data or current data related to the first communication device.

16. The first communication device of claim 11, wherein the one or more processors are further configured to:
receive environmental data; and
predict one or more characteristics of a current environment around the first communication device based on the received environmental data.

17. The first communication device of claim 11, wherein the one or more processors are further configured to determine one or more settings for executing the search.

18. The first communication device of claim 17, wherein the one or more settings include an amount of power, a frequency of a signal, or a width of the signal.

19. The first communication device of claim 18, wherein the one or more settings are selected based on whether the one or more settings increase detectability of an optical signal.

20. The first communication device of claim 11, wherein the amount of offset is estimated according to a trend in historical data or current data related to the first communication device.

* * * * *